No. 885,203. PATENTED APR. 21, 1908.
W. SWEET.
MECHANICAL MOVEMENT.
APPLICATION FILED APR. 25, 1907.

WITNESSES:
Augusta Viberg.
Ely E. Perry

Warren Sweet
INVENTOR
BY Chapin & Denny
His ATTORNEYS

UNITED STATES PATENT OFFICE.

WARREN SWEET, OF FORT WAYNE, INDIANA.

MECHANICAL MOVEMENT.

No. 885,203.  Specification of Letters Patent.  Patented April 21, 1908.

Application filed April 25, 1907. Serial No. 370,239.

*To all whom it may concern:*

Be it known that I, WARREN SWEET, a citizen of the United States, residing at Fort Wayne, in the county of Allen, in the State of Indiana, have invented certain new and useful Improvements in Mechanical Movements; and I do hereby declare that the following is a full, clear, and exact description of the invention, which will enable others skilled in the art to which it appertains to make and use the same, reference being had to the accompanying drawings, which form part of this specification.

My invention relates to improvements in mechanical movements, and is especially designed and adapted for employment in that type of washing machines in which an alternate reversal of the agitator shaft is required.

The object of my invention is to provide an improved mechanical movement of simple, efficient, reliable and economical construction, adapted to transform the rotary motion of the driving-shaft into an alternating motion of the driven-shaft, the driving shaft being adapted to be rotated in either direction with equal facility.

My invention consists of a driving-shaft, and a driven-shaft rotatably mounted in suitable bearings and in right-angular relation; a pair of bevel-gears loosely mounted on the driving shaft; a bevel gear fixed on the adjacent end of the driven-shaft, and adapted for a meshing engagement with the said gears on the driving-shaft; means for alternately locking the said loose gears one at a time to secure the desired reversal of the driven shaft; and means for supporting the operative mechanism in its coöperative relation.

The novel features of my invention reside in the means for securing the reversal of the driven shaft and the coöperative relation of such means to the actuating gears.

Figure 1:
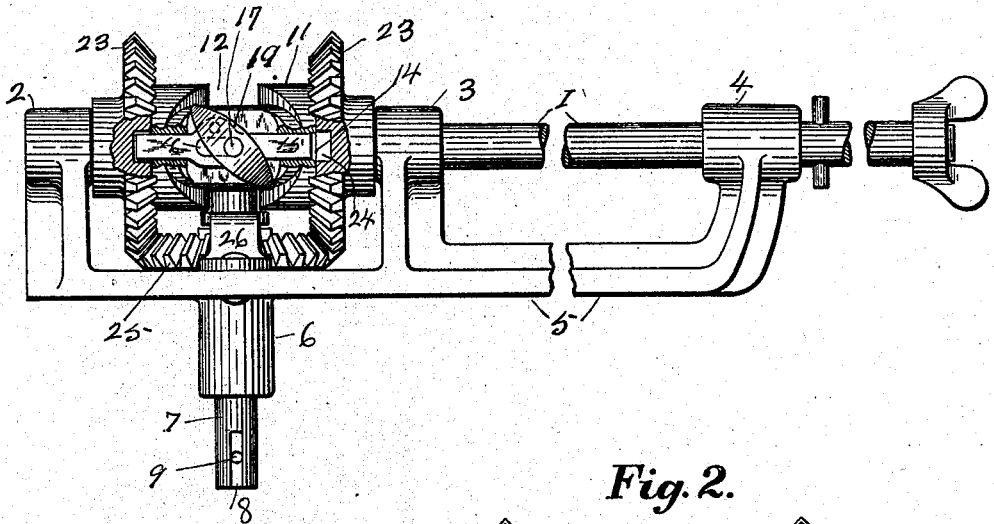
Figure 2:
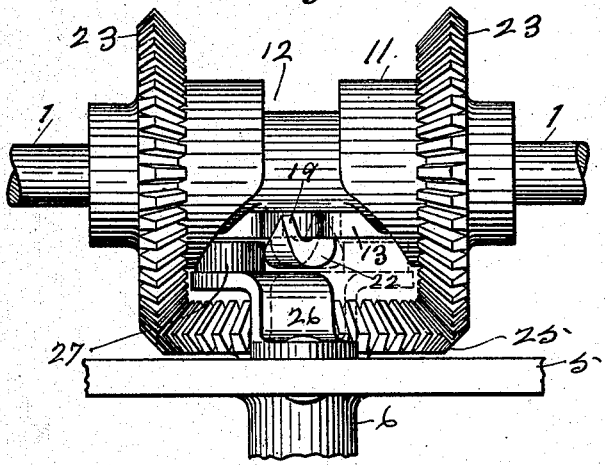
Figure 4:
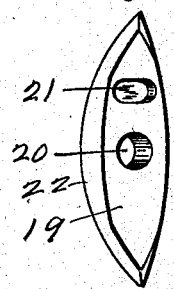
Figure 3:
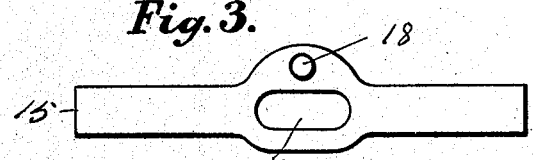

Similar reference numerals in the accompanying drawings indicate like parts in the several views in which Figure 1 is a side view of my invention broken away in part, and shown as adapted for a washing machine mechanism, the driving gears being broken away in part to show the lateral slots therein with which the locking plate forms an engagement. Fig. 2 is an enlarged side view of the mechanism with the sleeve in a position at right-angles to that shown in Fig. 1, showing the shifting lever and the operating arm therefor in one position and shown in dotted outlines in another position. Fig. 3 is a plan view of the centrally slotted locking plate showing the fixed pin thereon which forms an actuating engagement with the shifting lever, Fig. 4 is a perspective view of the shifting lever looking at the inner concave face thereof, showing the central opening for its pivot pin, and the transverse recess with which the said pin of the locking plate engages.

Referring at present to Fig. 1, when my invention is employed as a washing machine mechanism the horizontal driving shaft 1 is rotatably mounted in suitable bearings 2, 3 and 4 on a suitable bracket 5 of common or proper construction, to the lower face of which is fixed a pendent bearing sleeve 6 in register with a suitable vertical opening in the said bracket, in which the short vertical driven shaft 7 is rotatably mounted. This shaft 7 is shown as having a slot 8 and a diametric aperture 9 at its lower end in which a suitable dolly or agitator is slidably mounted in a well understood manner. The upper end of this driven shaft 7 carries a fixed bevel-gear wheel 25.

On the driving-shaft 1 near one end thereof and between the bearings 2 and 3 is fixed a sleeve 11 of special construction, having a central peripheral recess 12 embracing approximately about one-half of the circumference of the said sleeve, and adapted to guide the pivoted arm about to be described. The other half of the circumference of the fixed sleeve 11 is provided with a materially widened recess 13 of substantially the same depth as that of the recess 12, and whose two opposite sides are preferably suitable arcs to permit a free oscillation of the pivoted lever about to be described. The sleeve 11 in the recess 13 is provided with a longitudinal radial recess 14, Fig. 1, in which a locking plate 15 is slidably mounted. This plate 15 is somewhat longer than the recess 14, has a central longitudinal slot 16, Fig. 3, approximately midway of its ends to loosely receive the pin 17 whose lower end is fixed in the driving shaft, and is provided with a fixed pin 18 substantially midway of its ends for the purpose about to be described.

On the outer end of the fixed pin 17 is pivotally fulcrumed the concavo-convex lever 19. This lever has an opening 20 midway of its ends for the reception of the pin 17 and has its inner concave face near one end thereof provided with a suitable transverse recess 21 adapted to loosely receive and contain the free end of the fixed pin 18. The ends of the lever 19 are preferably pointed, and its opposite sides 22 correspondingly curved.

On the driving shaft 1 immediately adjacent to the ends of the sleeve 11 are loosely mounted the bevel gear-wheels 23 of identical construction, and each is provided at a suitable point upon its inner face with a recess 24 adapted to receive the corresponding end of the slidable locking plate 15. The upper end of the driven shaft 7 has a fixed bevel gear wheel 25 adapted for a meshing engagement with the bevel gears 23. At a suitable point on the bracket 5 adjacent to the gear-wheel 25 is pivoted the outer end of the arm 26 whose forward portion is arranged directly above the wheel 25 and in approximately parallel relation therewith, and carries at its free end an anti-friction roller 27.

The operation of my invention thus described is obvious and briefly stated is as follows: At each rotation of the driving shaft the driven shaft will be reversed by the actuating contact of the roller 27 alternately with the sides of the pivoted lever 19 thereby shifting the locking plate 15 into a locked engagement with the respective slots 24 of the gear wheels 23 alternately. It is obvious that the centrally arranged recess 12 through which the roller 27 must pass at each revolution of the driving shaft will so guide the roller that it will always enter the widened recess 13 midway of its sides, and will under the guidance of the curved sides of this recess force the lever 19 first one way and then the other alternately, thereby alternately shifting the locking plate 15 into a locked engagement first with one gear wheel 23 and then with the other. It is also apparent that my invention is adapted to be actuated in either direction with equal facility. While I prefer to have the pin 18 on the locking plate 15, it may as well be placed on the inner face of the lever 19 instead of the slot 21, and the slot for the said pin be arranged in the plate 15 if desired.

Having thus described my invention and the manner of employing the same what I desire to secure by Letters Patent is:

1. In a mechanical movement, a driving shaft; a sleeve fixed on the shaft, and provided midway of its ends with a circumferential recess having a materially widened portion, the sleeve having a longitudinal slot throughout its length in the widened portion of said recess; a pair of bevel gears loosely mounted on the shaft; a driven shaft provided upon one end thereof with a fixed bevel-gear adapted for a meshing engagement with the said gears on the driving shaft; and means for alternately locking one or the other of the loose gears on the driving-shaft consisting of a locking plate slidably mounted in the said slot, and adapted for a locked engagement with the loose gears one at a time, a pivoted lever arranged in said recess and having an actuating engagement with the said plate, and a pivoted arm whose extended inner end is arranged in said recess and is adapted for an actuating engagement with the said lever, substantially as described.

2. A mechanical movement comprising the following elements; a driving shaft; a driven shaft; a pair of bevel gears loosely mounted on the driving shaft; a bevel gear fixed on one end of the driven shaft and adapted for a meshing engagement with the said loose gears; a fixed sleeve on the driving shaft between the loose gears, and provided with a circumferential recess having a widened portion provided with a transverse slot therein; a plate slidably mounted in the said slot and adapted for a locked engagement with the said loose gears alternately; and means under the guidance of the widened portion of said recess for automatically shifting the said plate into its engagement at each revolution of the driving shaft.

3. In a mechanism of the class specified a driving member; a fixed sleeve on the driving member circumferentially recessed and longitudinally slotted; bevel gears in coöperative relation with the sleeve and loosely mounted on the driving member; a driven member provided upon one end with a fixed bevel gear in mesh with the above named gears; an automatic locking means adapted to secure the alternate reversal of the driven member, consisting of a sliding plate arranged in the slotted sleeve and adapted to engage the loose gears one at a time, a pivoted lever having an actuating engagement with the plate, and means for actuating the said lever under the guidance of the said circumferential recess.

4. In a mechanical movement a driving member provided with a fixed sleeve and loose bevel gears in coöperative relation therewith, the said sleeve having a circumferential recess and a longitudinal radial slot; a driven member having a fixed bevel gear adapted for a meshing engagement with the said loose gears; a plate slidably mounted in the said slot and adapted to alternately engage the loose gears; and means for shifting the said plate in opposite directions alternately consisting of a pivoted lever operatively connected with the said plate, and a pivoted arm whose inner end is adapted to actuate the said lever under the guidance of the said recess.

Signed by me at Fort Wayne, Allen county, State of Indiana, this 22nd day of April, A. D. 1907.

WARREN SWEET.

Witnesses:
 WATTS R. DENNY,
 AUGUSTA VIBERG.